No. 846,998. PATENTED MAR. 12, 1907.
J. F. HAMMOND.
PYROMETER.
APPLICATION FILED NOV. 1, 1905.
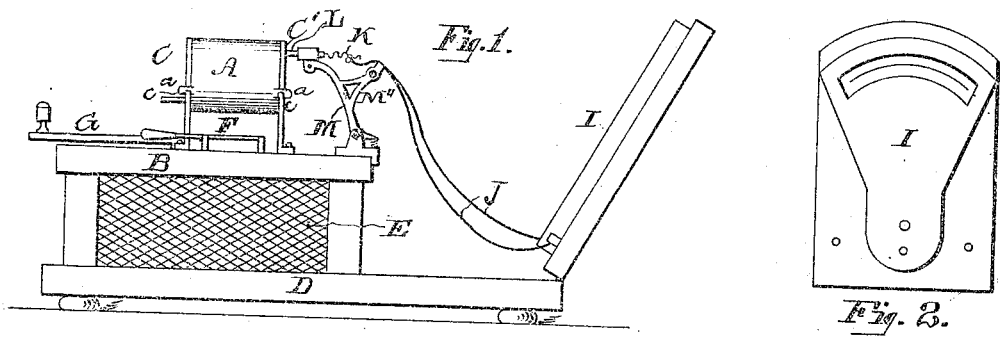
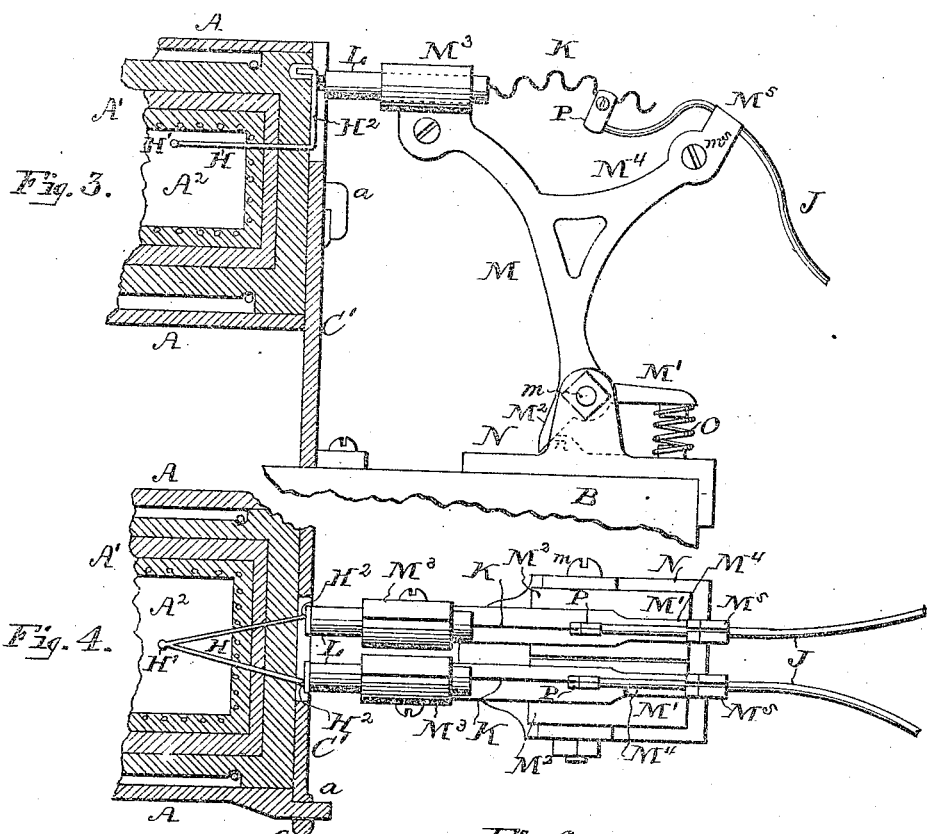

UNITED STATES PATENT OFFICE.

JOHN F. HAMMOND, OF BREWSTER, NEW YORK, ASSIGNOR TO THE S. S. WHITE DENTAL MANUFACTURING COMPANY, OF PHILADELPHIA, PENNSYLVANIA.

PYROMETER.

No. 846,998.   Specification of Letters Patent.   Patented March 12, 1907.

Application filed November 1, 1905. Serial No. 285,380.

*To all whom it may concern:*

Be it known that I, JOHN F. HAMMOND, a citizen of the United States, residing at Brewster, in the county of Putman and State of New York, have invented a certain new and useful Improvement in Pyrometers; and I do hereby declare the following to be a full, clear, and exact description of the invention, such as will enable others skilled in the art to which it appertains to make and use the same.

My invention relates to electric pyrometers of the well-known "thermocouple" type, and is applicable to furnaces of various kinds, but particularly to electric muffle-furnaces. Pyrometers of this class usually consist of a thermocouple located or adapted to be inserted within the muffle-chamber and composed of two members or wires of dissimilar metals united by a small ball, a galvanometer external to the furnace, and electric connections between the free ends of said thermocouple members and said galvanometer. One of the members or wires of the thermocouple as now made is of pure platinum, while the other may be an alloy of platinum and rhodium. The electrical connections between the couple and galvanometer consist of conductors which for cheapness are usually of copper.

When the couple is heated, a very light electric current is generated therein, the strength of which is proportioned to the degree of heat in the muffle. The force of this current, which is known as the "couple" current and which is entirely distinct from the current used to heat the muffle of an electric furnace, is indicated upon the galvanometer, which by suitable calibration will give accurate readings of the exact temperature of the muffle.

The general object of my invention is to improve the electrical connections between the thermocouple and galvanometer, one of my objects being to provide a readily-separable contact between said couple and the galvanometer-conductors.

Another object of my invention is to permanently attach the thermocouple to the muffle, so that it practically becomes a part thereof, with no outside projecting wires or mechanical connections to interfere with the removal or replacement of the muffle from or to its support.

A further object of my invention is to locate the point of union between the thermocouple and the galvanometer-conductors beyond or outside the radiant heat zone of the furnace, for if this point of union be within said heat zone the copper galvanometer-conductors, acting by contact with the dissimilar metals of the couple, will set up a separate thermo-electric action which will tend to neutralize, or at least vitiate, the reading of the galvanometer as a true index of the temperature within the muffle.

With this and other objects in view my invention consists of the improvements herein shown and described, and pointed out in the claims at the conclusion of the following specification.

In the accompanying drawings, illustrating a suitable embodiment of my invention, Figure 1 is a view in side elevation of a well-known form of electric furnace having my invention applied thereto. Fig. 2 is a face view of a galvanometer of the kind I prefer to use with my invention. Fig. 3 is a view in side elevation of my invention on a larger scale than the preceding views and showing the rear portion of a furnace-muffle in vertical section. Fig. 4 is a top or plan view of the parts shown in Fig. 3. Fig. 5 is a front or end view of the upper portion of the thermocouple-extension carriers. Fig. 6 is a sectional view, on a still larger scale, of the clip for uniting the thermocouple extensions and galvanometer-conductors.

The furnace to which I have herein shown my improvements as being applied is the well-known Hammond electric furnace, for which Letters Patent of the United States No. 688,170 were granted me December 3, 1901, although it is to be understood that my present improvements are applicable to other forms and kinds of furnaces. This furnace, as indicated in the accompanying drawings and more fully shown and described in the before-mentioned Letters Patent, comprises the following parts: A two-part muffle A A', consisting of an outer metal barrel A and an inner fire-clay muffle A', is mounted over a base or slab B, of insulating material. The muffle proper is inclosed in the metal barrel, and the latter is provided with notched projections *a* at front and rear, which detachably engage similar projections *c* on uprights C C', secured to the base B. The front end of the barrel is closed and provided with an opening or door (not shown) corresponding in shape and size with the muffle opening or chamber $A^2$ and through which access may be had to the same. The rear end of the barrel is open, and the muffle proper when in place abuts against the rear upright $C'$, which is platelike in form and entirely closes the rear end of the barrel. In the preferred form of Hammond furnace the base or slab B is supported over a platform D, between which and said base is a rheostat inclosed in an open-work frame E. Suitable electric spring-contact devices (also not shown herein) are provided between the muffle and rheostat, while a knife-switch F, controlling-lever G, contact-stops, and binding-posts are mounted upon the base B. By means of this construction the muffle may be quickly removed from the furnace by simply lifting the barrel from its supports and replacing it again without deranging the electrical connections and without the necessity of disconnecting or connecting the same, this being provided for by the spring-contact devices.

Having briefly described one form of furnace to which my invention is applicable, I will now describe the invention itself, first referring to the thermocouple and the improved manner of applying it to the muffle.

The thermocouple H, consisting of two members or wires of dissimilar metals united at their inner ends by a ball $H'$, as usual, is located in the rear of the muffle-chamber $A^2$, near the top thereof, where it will be least likely to interfere with the objects placed in the furnace. The wires pass through the rear wall of the muffle in which they are embedded and on the outside of which they are exposed, as at $H^2$. Instead of permitting the wires to project beyond the outside of the muffle for the purpose of making electrical connection with a galvanometer, as is customary, they are bent and extended a short distance close to or in contact with the exterior muffle-wall. The exposed portions $H^2$ of the wires are shown as extending vertically with their ends penetrating the muffle for the purpose of more securely holding them in place. It should be observed that the thermocouple may be located in any other position from that just described which is best adapted for the particular construction of connecting devices next to be described.

A galvanometer I of any suitable form and construction may be located in any convenient position near to or far from the furnace, as may be desired. In the present instance it is mounted in an inclined position upon the platform D to the rear of the furnace, where it is clearly visible to the person operating the furnace and not in the way of the same. The usual electrical connection between the thermocouple and galvanometer consists of copper conductors extending from the galvanometer and coupled directly to the exposed ends of the thermocouple members which project outside the muffle. In place of this connection I provide a readily-separable contact device which in addition to permitting the muffle to be removed and replaced without necessity of disconnecting and connecting electrical couplings possesses other advantages.

Two short lengths of wire K K, each of the same metal as the members of the thermocouple with which they respectively come in contact, are interposed between the exposed portions $H^2$ of said thermocouple members and the galvanometer-conductors J J. These wires K K may be regarded as exterior extensions of the thermocouple members and will be hereinafter referred to as "thermocouple extensions." Each of these extensions K is supported by means that will cause said extensions to normally bear upon the exposed portions of the thermocouple members, the rear plate $C^1$ of the furnace being cut away for this purpose. In this way a yielding and readily-separable contact is provided between the thermocouple and its extensions. The preferred means, as shown, consists of a carrier M for each extension, the pair of carriers being mounted side by side upon the furnace-base B and best made independently movable or adjustable toward and away from the muffle. Surrounding each extension K is a tube L, of non-conducting material, as glass or porcelain, molded or otherwise formed upon the extensions and affording means for adjustably attaching said extensions to and insulating them from the carriers, said tubes being held by carrier-clamps $M^3$. The wire of which each extension is composed protrudes beyond the front end of its tube, across which it may be bent, as shown in Fig. 5, to afford a larger bearing-surface for contact with the exposed thermocouple against which it is adapted to bear, while the rear end of said wire is extended some distance beyond the opposite end of the tube for connection with the galvanometer-conductor.

The carriers shown are pivoted at $m$ to a plate N, secured to the furnace, in this instance to the base B, so as to have a slight rocking movement independently of each other toward and away from the muffle. A spring O, interposed between the plate N and an arm $M'$ of the carrier, serves to force the carrier forward and cause the extension to bear against the exposed thermocouple member, while another arm $M^2$ of the carrier, coming in contact with a lug $n$ of the plate N, limits the forward rocking movement of the carrier.

Instead of uniting the couple extensions and galvanometer-conductors in the ordinary manner I prefer to first connect the conductors to the carriers for the purpose of taking the strain or pull of the conductors off of said extensions. For this purpose the carriers are each formed with an arm or extension M⁴, having a split clamp M⁵ and screw m⁵ for holding the conductors. A split clamp P may be employed for uniting the conductors with the respective extensions.

The thermocouple, it will be seen, is built in the muffle, thus being a part thereof and movable therewith. The extensions of the thermocouple are always in position to make proper contact with the thermocouple itself, the spring-carriers forcing said extensions against the exposed wires of the thermocouple when the muffle is in position. In this way the muffle may be readily placed in position or removed therefrom without the necessity of making or breaking any connections or couplings and, in fact, without paying any attention whatever to the electrical connections between the thermocouple and galvanometer.

By connecting the galvanometer-wires with the thermocouple extensions instead of directly with the thermocouple itself the necessity of connecting and disconnecting the galvanometer-wires each time the muffle is placed in position or removed therefrom is obviated. Moreover, by this means the point of connection between the thermocouple wires and the galvanometer-wires may be located beyond the radiant heat zone of the muffle without having the thermocouple-wires projecting outside of the muffle. As large portions of the thermocouple extensions are exposed to the air, there is no liability of these extensions becoming heated, which would interfere with the correct reading of the galvanometer.

Another advantage of my invention is the fact that the thermocouple is entirely relieved of all strain or pull to which the galvanometer-wires may be subjected in the operation of the furnace. Should these wires be accidentally pulled or in any way disturbed, the couple extensions will simply be withdrawn from contact with the thermocouple, the effect of which will be to interrupt the pyrometer-current for the time being. Just as soon as the pull on or the interruption of the galvanometer-wires ceases the spring-carriers will automatically throw the extensions into contact with the thermo couple, whereby the pyrometer-current is immediately restored. Furthermore, the extensions themselves are relieved of strain from pull of the galvanometer-conductors by connecting said galvanometer-conductors to the carriers in rear of the union between the same. By so doing, the pull of said conductors comes upon the carriers and not upon said extensions.

The carriers may consist simply of plate-springs; but my invention is not confined to the precise form of carrier shown nor to any other details of construction herein illustrated and described.

I claim as my invention—

1. A furnace-muffle having a thermocouple mounted therein and forming a part thereof, said thermocouple being located in the muffle-chamber with its members extending through the walls of said muffle and exposed upon the outside thereof, the exposed portions of said members being bent and extended along the outer wall of the muffle.

2. In an electric pyrometer-furnace, the combination of a removably-supported muffle, a thermocouple mounted therein and exposed on the outside thereof, a galvanometer, electrical connections between said thermocouple and galvanometer, and spring-actuated carriers for supporting said connections in yielding and separable contact with the exposed thermocouple.

3. In an electric pyrometer-furnace, the combination of a muffle, a thermocouple mounted therein and exposed on the outside thereof, said couple consisting of two members of dissimilar metals, two thermocouple extensions, each of the same metal as the thermocouple member with which it is adapted to come in contact, conductors connected to said extensions at a point beyond the radiant heat zone of the furnace, said conductors being of a different metal from the thermocouple and its extensions, and a galvanometer to which said conductors are connected.

4. In an electric pyrometer-furnace, the combination of a muffle, a thermocouple mounted therein and exposed upon the outside thereof, thermocouple extensions, a galvanometer, conductors between said galvanometer and thermocouple extensions, and spring-actuated carriers for said thermocouple extensions.

5. In an electric pyrometer-furnace, the combination of a removably-supported muffle, a thermocouple mounted therein and exposed on the outside thereof, said couple consisting of two members of dissimilar metals, two thermocouple extensions each of the same metal as the thermocouple member with which it is adapted to come in contact, spring-actuated carriers for supporting said extensions in yielding and separable contact with the exposed thermocouple members, conductors of a different metal from the thermocouple and its extensions connected to said extensions at a point beyond the radiant heat zone of the furnace, and a galvanometer to which said conductors are connected.

6. In an electric pyrometer-furnace, the combination of a muffle, a thermocouple mounted therein and exposed upon the outside thereof, thermocouple extensions having no permanent connection with said thermocouple, non-conducting tubes surrounding said extensions which project beyond the ends thereof, spring-actuated carriers for supporting said tubes and causing the forward end of each thermocouple extension to bear upon the exposed portion of its respective thermocouple, and conductors connected to the other ends of said thermocouple extensions.

In testimony whereof I affix my signature in presence of two witnesses.

JOHN F. HAMMOND. [L. S.]

Witnesses:
SEYMOUR CASE,
G. A. GULOWSEN